United States Patent
Trimbell et al.

(10) Patent No.: US 7,571,430 B2
(45) Date of Patent: Aug. 4, 2009

(54) ADAPTIVE DISPATCH TABLE BASED ON TEMPLATES

(75) Inventors: Forrest Trimbell, Longmont, CO (US); Joseph G. Moore, Wichita, KS (US); Satish Sangapu, Wichita, KS (US); William Hetrick, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 457 days.

(21) Appl. No.: 11/041,714

(22) Filed: Jan. 24, 2005

(65) Prior Publication Data

US 2006/0164269 A1    Jul. 27, 2006

(51) Int. Cl.
    G06F 9/45    (2006.01)
(52) U.S. Cl. .................................................. 717/140
(58) Field of Classification Search ................ 717/133, 717/140
    See application file for complete search history.

(56) References Cited

U.S. PATENT DOCUMENTS 5,428,782 A * 6/1995 White ........................ 718/101
5,860,004 A * 1/1999 Fowlow et al. ............. 717/109
6,141,792 A * 10/2000 Acker et al. ................ 717/116
6,405,368 B1 * 6/2002 Freyburger ................. 717/140

OTHER PUBLICATIONS

Extreme C++, Microsoft Interactive Developer, Sep. 1998 by Steve Zimmerman.*
Extending the C++ STL with custom containers, Jul. 3, 2002.*
Extreme C++, Microsoft Interactive Developer, Sep. 1998 by Steve Zimmerman.*
Steve Zimmerman, Extreme C++, Sep. 1998, Microsoft Interactive Developer.*

* cited by examiner

*Primary Examiner*—Wei Y Zhen
*Assistant Examiner*—Junchun Wu
(74) *Attorney, Agent, or Firm*—Suiter Swantz pc llo

(57) ABSTRACT

The present invention is directed to a method of an adaptive procedure table which is capable of providing default behaviors for each procedure if a corresponding procedure is not defined or has been removed from a software build. The default behaviors for each procedure may be defined in a template file provided by a developer before a compile time of software. The present invention may permit a module that defines the implementation of a procedure to be removed from the software build without requiring source code changes. As such, the developer may be allowed to remove or add certain features from a compiled program without introducing compile time or link time errors.

6 Claims, 3 Drawing Sheets

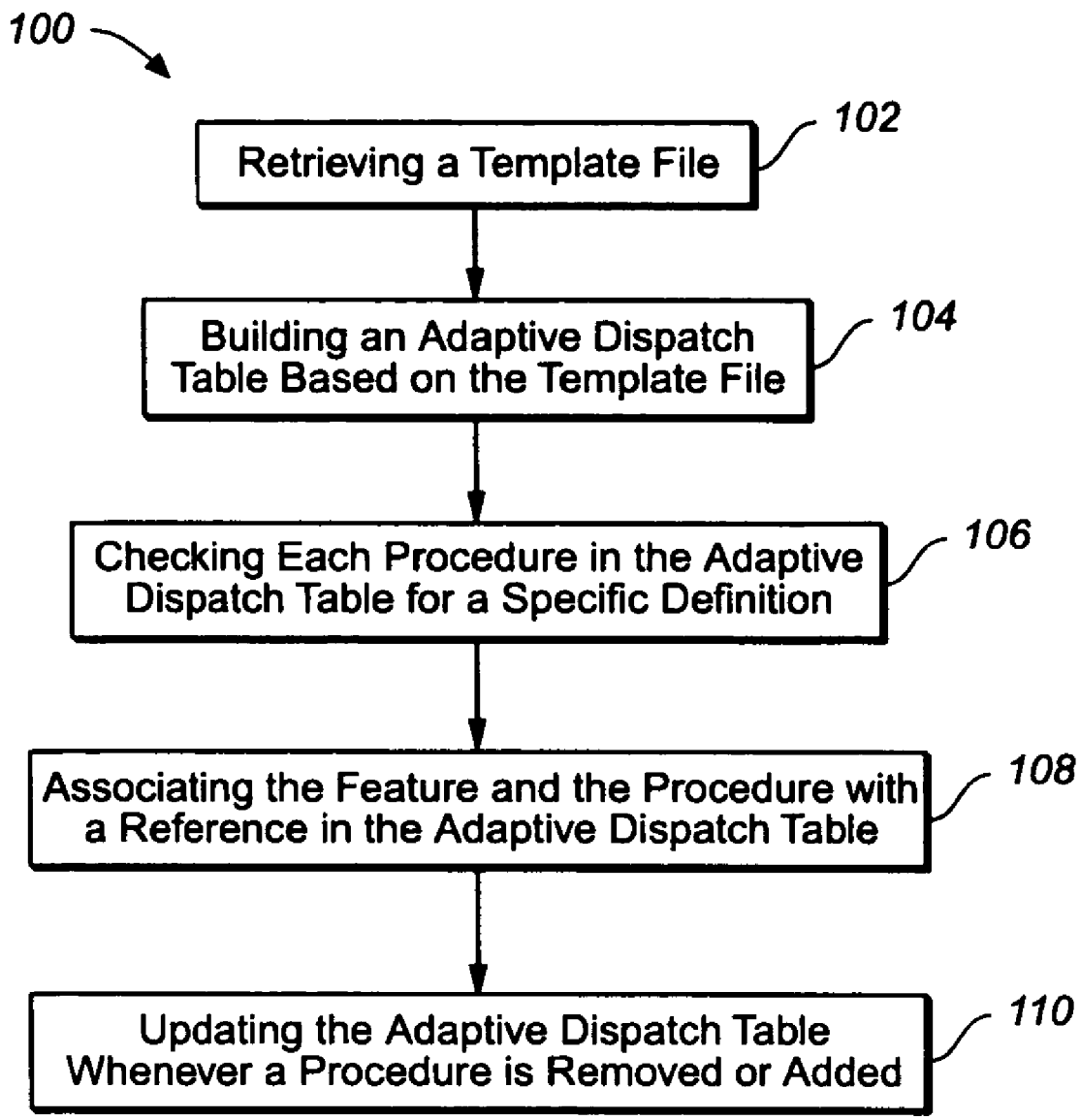
FIG._1

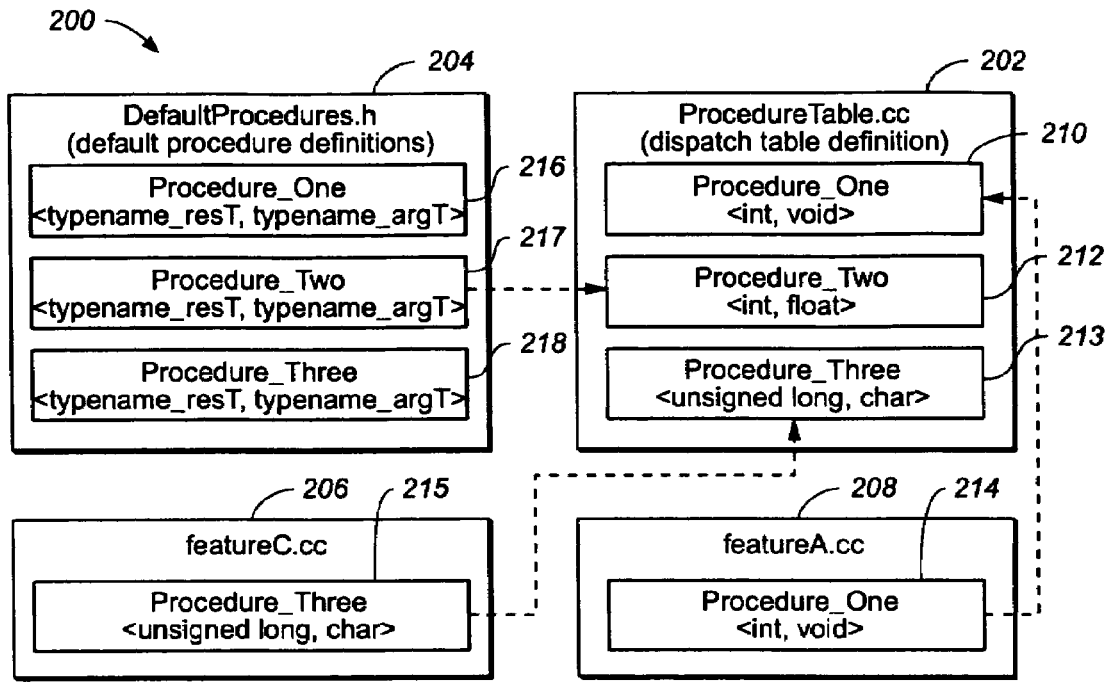
FIG._2
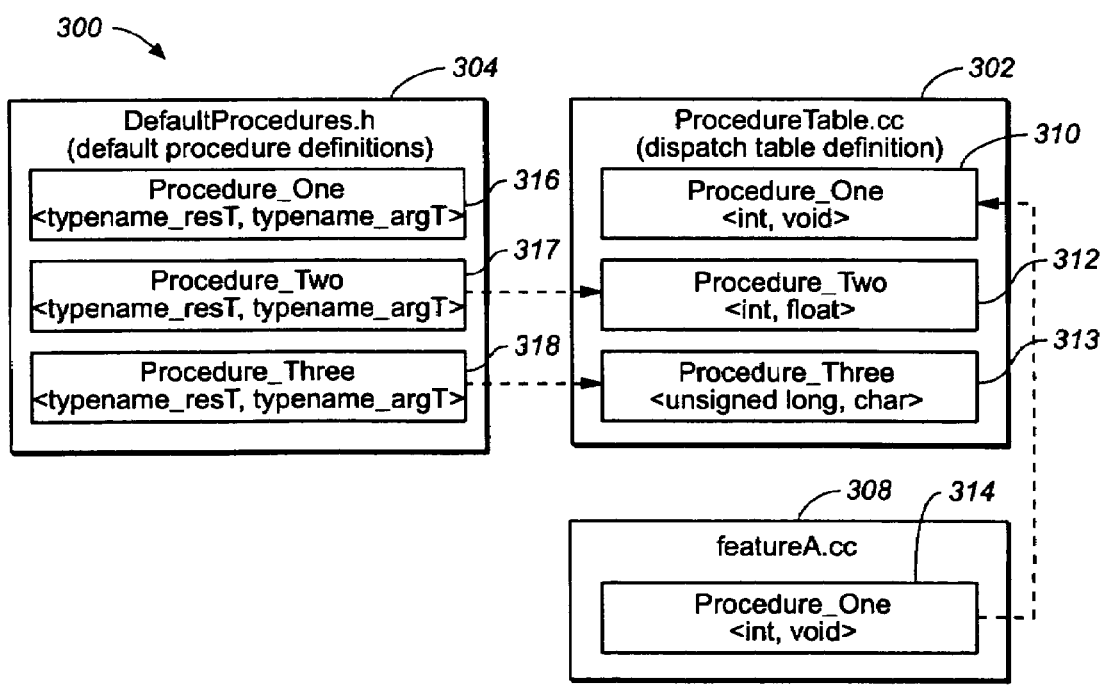
FIG._3

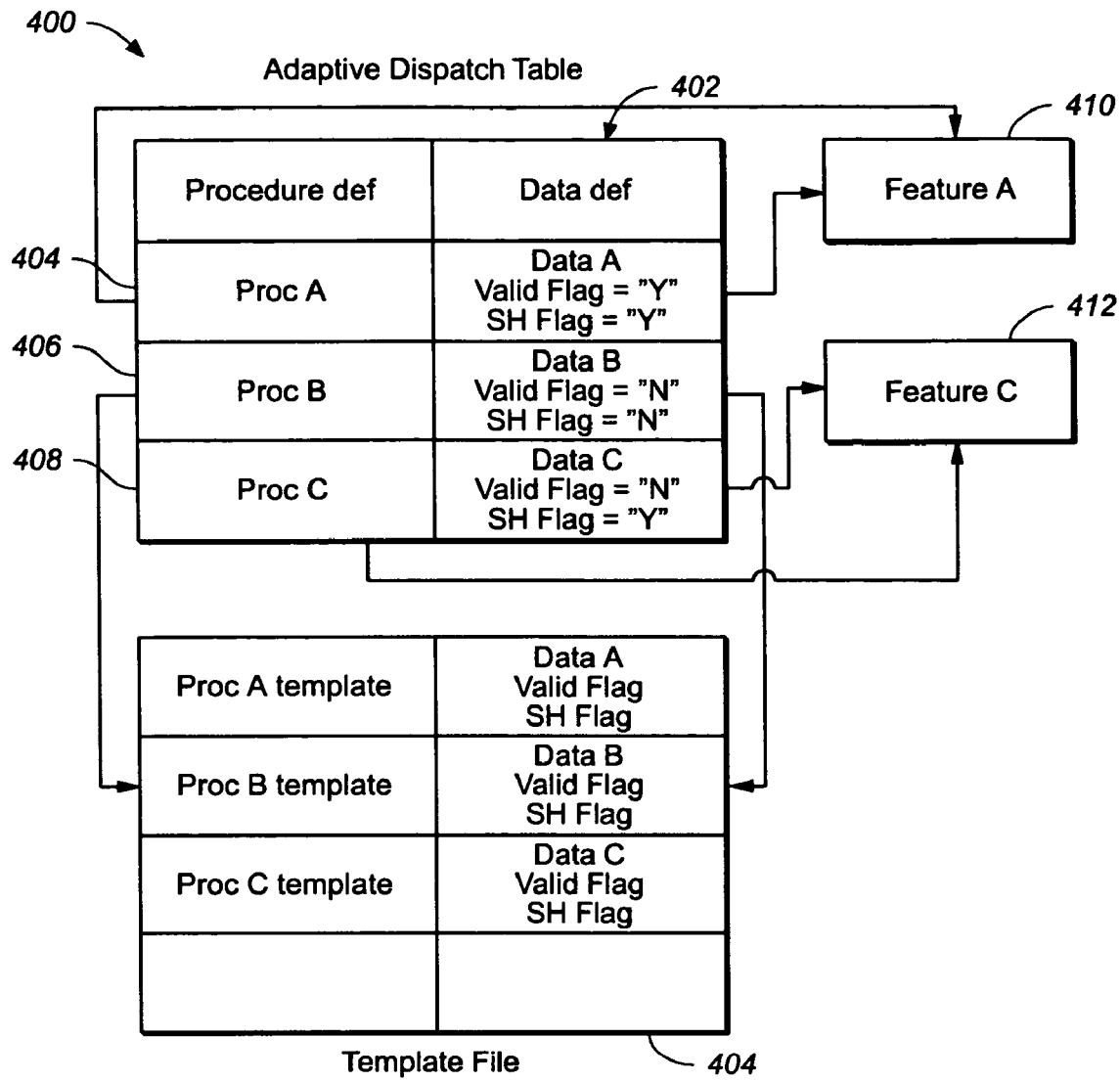
FIG._4

ADAPTIVE DISPATCH TABLE BASED ON TEMPLATES

FIELD OF THE INVENTION

The present invention generally relates to the field of computer software, and particularly to a method of creating an adaptive dispatch table based on templates.

BACKGROUND OF THE INVENTION

Since the advent of high-level languages, many developers have desired to provide flexible and scalable software which can be implemented in various products. Such flexible and scalable software may be cost-effective when small changes to the source code are required to accommodate customer's preferences, different product requirements, software version upgrading or the like. One of the high-level languages suitable for providing flexible and scalable software is C++ which is one of the most sophisticated programming languages available to developers. Its power is rooted in the concept of the class, templates, and a natural extension to data structure found in C language. Through out the developing phase, a developer may desire to remove or add certain features from/to a compiled C++ program without rewriting the source code. However, if any feature is removed arbitrarily from a compiled program, it will introduce compile-time or link-time errors.

Therefore, it would be desirable to provide a method which allows the developer to remove or add certain features from a compiled program without introducing errors. It would be also desirable to provide a method which provides a default behavior for a procedure if the procedure is not defined in the compiled program.

SUMMARY OF THE INVENTION

Accordingly, the present invention provides a method which allows the developer to remove or add certain features from a compiled program without introducing errors through an adaptive dispatch table. The adaptive dispatch table may be capable of providing default behaviors for each procedure if a corresponding procedure is not defined or has been removed from a compiled program. The present invention may permit a module that defines the implementation of a procedure to be removed from a build of software without requiring source code changes or recompilations.

In a first aspect of the present invention, a method for creating an adaptive procedure table based on templates is provided. A list of procedure templates containing generic definitions (templates) of procedures may be provided. During a compile time, the list of procedure templates may be retrieved in order to build an adaptive procedure table. The adaptive procedure table may include an entry for each procedure which has an initial reference to a generic definition of the procedure in the list of procedure templates. The method may walk through the adaptive procedure table checking whether each of procedures in the adaptive table has a specific definition made in features (modules). If the method finds that a certain feature makes a specific definition for a procedure, the feature may be associated with the procedure in the adaptive procedure table. Then, the entry of the procedure may have a reference to the specific definition of the procedure. The adaptive procedure table may be implemented and utilized by a compiler and a linker.

In a second aspect of the present invention, an adaptive dispatch table may be provided. The adaptive dispatch table may be capable of providing generic definitions of a procedure and data associated with the procedure when the procedure is not defined or has been removed from the compiled program (software build). The adaptive dispatch table may have an entry for each procedure which has a reference to either specific definitions or generic definitions of the procedure and the data. The adaptive dispatch table may have a valid flag for the procedure of which value may indicate whether the corresponding procedure is specifically implemented in a certain feature. A list of supported procedures may be determined by checking the value flags in the adaptive dispatch table without requiring the execution of each procedure.

Additionally, the adaptive dispatch table may include a special handling flag for each procedure. The value of the special handling flag may indicate whether any special handling is required for the corresponding procedure. In an advantageous aspect of the present invention, various flags may be maintained in the adaptive dispatch table so that pre-existing tables can be merged easily into the adaptive dispatch table.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is an illustration of a flow diagram illustrating a method implemented in accordance with an exemplary embodiment of the present invention;

FIG. 2 is a block diagram illustrating an adaptive dispatch table wherein the adaptive dispatch table including entries for three procedures;

FIG. 3 is a block diagram illustrating the adaptive dispatch table in FIG. 2 when a procedure is removed from a compiled code; and FIG. 4 is a block diagram illustrating an alternative adaptive dispatch table.

DETAILED DESCRIPTION OF THE INVENTION

Reference will now be made in detail to the presently preferred embodiments of the invention, examples of which are illustrated in the accompanying drawings.

The present invention is directed to a method of an adaptive dispatch table which is capable of providing default behaviors for each procedure if a corresponding procedure is not defined or has been removed from a software build. The default behaviors for each procedure may be defined in a template file provided by a developer. The present invention may permit a module that defines the implementation of a procedure to be removed from the software build without requiring source code changes or recompilation. As such, the developer may be allowed to remove or add certain features from a compiled program without introducing compile-time or link-time errors. In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order not to obscure the present invention.

Referring generally now to FIGS. 1 through 4, exemplary embodiments of the present invention are shown.

Referring now to FIG. 1, a flow diagram 100 illustrating a method implemented in accordance with an exemplary embodiment of the present invention is shown. In an embodiment of the present invention, an adaptive dispatch table may be implemented in order to provide a default behavior for each procedure included in the adaptive dispatch table even if a corresponding procedure is not defined elsewhere in a compiled program. It is to be noted that the default behavior for each procedure may be defined in a template header file provided by a software developer. Preferably, the template header file may include a definition of a procedure with possible data types which are supposed to be passed to the procedure, appropriate operations for the procedure when the specific operation is not implemented, and the like.

At step 102, the template header file may be retrieved during a compile-time. The adaptive dispatch table may be built based on the retrieved template file at step 104. Initially, an entry for each procedure may have a reference to a default definition of the corresponding procedure in the template header file. At step 106, the method may walk through the adaptive procedure table checking whether each of the procedures has a specific definition made in features (modules). If the method finds that a certain feature supplies a specific definition for a procedure, the feature and the procedure may be associated with a reference in the adaptive procedure table at step 108. The adaptive procedure table may be updated whenever a certain procedure (or a feature defining the certain procedure) is removed from the software build at step 110. The developer may desire to add a new feature to the compiled program. When the newly added feature makes a special definition of a procedure, the adaptive dispatch table may be updated accordingly at step 110. It is to be noted that the adaptive dispatch table may be assumed to include an entry of each procedure which may be potentially added to the software build. The adaptive dispatch table may be implemented and utilized by a compiler and a linker.

In an embodiment of the present invention, procedures may be defined in the form of a static member function of a C++ template class (or structure) where at least one argument to the procedure is supplied as a template argument. C++ is one of the most sophisticated programming languages available to developers. Its power is rooted in the concept of the class, templates, and a natural extension to data structure found in C language. It should be appreciated that C++ template class is used for illustrative purposes. One of ordinary skill in the art will appreciate that there are various high-level languages suitable for being utilized in the present invention. In an exemplary embodiment of the present invention, a procedure called Procedure_One (which is a template class) may be defined in a default header file as follows:

```
//  DefaultProcedures.h
template< typename __resultT, typename __argumentT >
struct Procedure_One
{
    static __resultT* proc( __argumentT* arg )
    {
        throw "Procedure Not Supported";
    }
};
```

The above default header file may provide a default definition of Procedure_One::proc( ) for all possible data types being passed to the procedure (Procedure_One::proc( )). The procedure, proc( ), would perform any operation that may be appropriate for a procedure that has not been defined. For example, the appropriate operation may be to notify a user that the selected feature is not available, to perform nothing, or the like. Initially, an adaptive dispatch table may include an entry for Procedure_One::proc( ) with a reference to a definition contained by the header file. When a feature defines Procedure_One::proc( ) specifically for its intended types, the adaptive dispatch table may update the reference of the entry for Procedure_One::proc( ) to the feature. An example of a feature which specializes Procedure_One template is as follows:

```
//  featureA.cc
#include "DefaultProcedures.h"
template<>
struct Procedure_One<int, void>
{
    static int* proc( void* arg )
    {
        printf("Procedure One has been called.\n");
    }
};
```

The exemplary feature, featureA.cc, may instruct the compiler and the linker that any reference is made to a function called Procedure_One::proc( ), then it should use the specific definition supplied by featureA.cc. If featureA.cc is not built into the software program, then any reference to Procedure_One::proc( ) will use the default template definition. In an embodiment of the present invention, the adaptive dispatch table may include the reference information of procedures. Thus, the compiler and the linker may consult with the adaptive dispatch table for any reference made to Procedure_One::proc( ). The adaptive dispatch table containing the reference information of Procedure_One::proc( ) may be defined in terms of template member functions as follows:

```
//ProcedureTable.cc
typedef void* (*PROCPTR)(...); // Generic pointer to function
// Table of pointers to functions:
PROCPTR dispatchTable[] =
{
    (PROCPTR) Procedure_One<int, void>::proc,
    (PROCPTR) Procedure_Two<int, float>::proc,
    (PROCPTR) Procedure_Three<unsigned long, char>::proc
};
```

Referring now to FIG. 2, a block diagram 200 illustrating an adaptive dispatch table including entries for three procedures which are defined in features and a default template file is shown. In an exemplary embodiment of the present invention, a default template file 204 may be a default header file having default template classes 216, 217, 218 for all the procedures (Procedure_One, Procedure_Two and Procedure_Three) for a software build. The adaptive dispatch table 202 may include an entry of Procedure_One 210, an entry of Procedure_Two 212, and an entry of Procedure_Three 213. For example, Procedure_One is defined in featureA.cc, Procedure_Three is defined in featureC.cc and Procedure_Two is not defined by any feature yet. The dispatch table may have the entry 210 of Procedure_One associated with the Procedure_One template 214 in featureA.cc 208, the entry 213 of Procedure_Two associated with the procedure_two template 217 in the default template file 204, and the entry 212 of Procedure_Three associated with the Procedure_Three template 215 in featureC.cc 206. When there is any reference made to Procedure_One and Procedure_Three, the C++ linker may resolve the reference in the dispatch table to use the procedures defined by featureA.cc and featureC.cc respectively. When there is any reference made to Procedure_Two, Procedure_Two template 217 defined in the default template file may be used since no other module (feature) makes a specific definition for it.

Referring now to FIG. 3, a block diagram 300 illustrating the adaptive dispatch table when one feature is removed from a compiled program is shown. In the above exemplary embodiment, the developer may desire to remove a certain feature from the software build without source code changes. For example, when featureC.cc is removed from the software build, the procedure Procedure_Three is also removed as a result. Then, the adaptive dispatch table may update the entry 313 of Procedure_Three to be associated with Procedure_Three template 318 which is the default definition of the procedure Procedure_Three.

In an alternative embodiment of the present invention, a default template file may also include default data into a template class associated with a procedure. As such, an adaptive dispatch table may provide generic definitions of a procedure and generic data associated with the procedure when the procedure is not defined or has been removed from the compiled code (software build). The example of such a template file may be defined as follows:

```
typedef struct
{
    bool hint1;
    bool hint2;
    bool hint3;
} Hints;
template< typename _r, typename _a>
struct Procedure_One{
    static r* proc( a* arg)
    {
    }
    static Hints hints = {false, false, false};
};
```

When a procedure is newly added by the developer, the associated data (in this example, the static member, "hints") may also be given specific values as part of the procedure. As such, the present invention may not require the developer to edit an extra source file to change the data associated with the procedure. The example of the procedure and its associated data may be defined as follows:

```
template<>
struct Procedure_One <int,void>
{
    static int* proc(_void* arg)
    {
        ...
    }
    static Hints hints = {true, true, false};
};
```

In an exemplary embodiment of the present invention, the adaptive dispatch table may have an entry for a reference of a procedure and a valid flag for the procedure. The value of the valid flag may indicate whether the corresponding procedure is specifically implemented in a certain feature. A list of supported procedures may be constructed by checking the values of valid flags in the adaptive dispatch table without requiring the execution of each procedure. Additionally, an adaptive dispatch table may include a special handling flag for each procedure. The value of the special handling flag may indicate whether any special handling is required for the corresponding procedure.

Referring now to FIG. 4, a block diagram 400 of an adaptive dispatch table including a valid flag and a special handling flag for each procedure is shown. The adaptive dispatch table 402 may include entries for procedures and data associated with the procedures. For example, Feature A defines specific definition of Procedure_A and Data_A which is associated with the procedure. The entry 404 for Procedure_A in the adaptive dispatch table 402 may provide a reference for the procedure definition and the data definition in feature A 410. In the adaptive dispatch table 404, the valid flag of the entry 404 may be marked "Y" indicating Procedure_A has a specific definition. The SH flag of the entry 404 may be marked "Y" indicating that Procedure_A may require special handling performed by a server. In an embodiment of the present invention, the value flag and the SH flag for each procedure may have initial value of "N" when the adaptive dispatch table is generated based on the default template file. Advantageously, the adaptive dispatch table may include various flags which are utilized to merge pre-existing tables into the adaptive dispatch table.

In a particular embodiment of the present invention, SUN ONC Remote Procedure Call (RPC) protocol may be utilized to provide a server interface to other software. It is to be noted that RPC server and ONC RPC protocol implementation are described for the illustrative purposes only. A standard part of implementing ONC RPC protocol may require using a program (known as rpcgen) to automatically generate certain code such as External Data Representation standard (XDR) routines that transform data to a portable format, a header file defining data types and procedure declarations required for the RPC server, and a procedure dispatch table that is used by the RPC server to direct incoming RPC requests. Normally, the procedure declarations in the generated header file are C function prototypes and the dispatch table is an array of pointers to those functions.

In the particular embodiment of the present invention, a modified rpcgen may be utilized to replace the C function prototypes in the header file with generic class templates for each procedure (one class per RPC procedure). Each one of these defines what to do if no appropriately defined implementation is found. The example of an default template header file from rpcgen may be defined as follows:

```
struct Values
{
    int x;
    int y;
};
...
template< typename _r, typename _a>
struct Add
{
    static _r* proc( _a* arg )
    {
        throw NoProcedure;
    }
};
template< typename _r, typename _a>
struct Sub
{
```

```
        static __r* proc( __a* arg )
        {
            throw NoProcedure;
        }
    };
    ...
```

Similarly, the file generated by rpcgen that contains the dispatch table may contain pointers to static member functions of the specific template instances of each procedure instead of pointers to standard C functions. The example of an adaptive dispatch file from rpcgen may be defined as follows:

```
    void* (dispatchTable)(...)[] =
    {
        ...
        Add<int,Values>::proc,
        Sub<int,Values>::proc,
        ...
    };
```

These "adaptive" header and dispatch files may allow the developer to define Add (procedure) or Sub (procedure) at will by defining a corresponding specialized class template. The adaptive dispatch table may permit whole groups of RPC procedures to be switched in and out of a product at build time. Additionally, the adaptive dispatch table may also allow the developer to have the luxury of being able to add support for procedures one at a time even though an entire group of procedures has been defined in the API file which rpcgen takes as input.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the adaptive dispatch table of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for creating an adaptive procedure table based on templates, comprising:
   retrieving a list of procedure templates;
   building the adaptive procedure table based on the list of procedure templates, the adaptive procedure table including a procedure;
   providing a reference in the adaptive procedure table to a default behavior for the procedure, said default behavior being defined in the list of procedure templates;
   checking whether the procedure in the adaptive procedure table has a specific definition made by a feature, wherein the feature is built into a compiled program; and
   when the feature makes a specific definition for the procedure, updating the reference by associating the feature with the procedure via the updated reference in the adaptive table,
   when the procedure is removed from the compiled program, re-updating the updated reference of the procedure in the adaptive procedure table by associating the removed procedure with the default behavior,
   wherein the adaptive procedure table is implemented by a compiler and a linker, the adaptive procedure table including a special handling flag for each of the plurality of procedures for indicating whether special handling by a server is required for a corresponding procedure included in the plurality of procedures.

2. The method as described in claim 1, wherein the adaptive procedure table is built at a compile time.

3. The method as described in claim 1, wherein the linker finds the reference of the procedure from the adaptive procedure table.

4. The method as described in claim 1, wherein the adaptive procedure table is utilized by an objective oriented language.

5. The method as described in claim 4, wherein the objective oriented language is C++ language.

6. A computer-readable medium containing computer-executable instructions for performing a method for providing an adaptive procedure table based on a templates, said method comprising:
   retrieving a list of procedure templates;
   building the adaptive procedure table based on the list of procedure templates, the adaptive procedure table including a procedure;
   providing a reference in the adaptive procedure table to a default behavior for the procedure, said default behavior being defined in the list of procedure templates;
   checking whether the procedure in the adaptive procedure table has a specific definition made by a feature, wherein the feature is built into a compiled program; and
   when the feature makes a specific definition for the procedure, updating the reference by associating the feature with the procedure via the updated reference in the adaptive table;
   when the procedure is removed from the compiled program, re-updating the updated reference of the removed procedure in the adaptive procedure table by associating the removed procedure with a default behavior definition of a template header file,
   wherein the adaptive procedure table is implemented by a compiler and a linker, the adaptive procedure table including a special handling flag for each of the plurality of procedures for indicating whether special handling by a sewer is required for a corresponding procedure included in the plurality of procedures.

* * * * *